United States Patent [19]
Meinke et al.

[11] 4,091,687
[45] May 30, 1978

[54] HIGH-SPEED ROTATION SYSTEM

[75] Inventors: Peter Meinke, Grossinzemoos; Kurt Fiedler, Hamburg, both of Germany

[73] Assignees: Maschinenfabrik Augsburg-Nurnberg Aktiengesellschaft, Munich; Gutehoffnungshutte Sterkrade Aktiengesellschaft, Oberhausen, both of Germany

[21] Appl. No.: 763,626

[22] Filed: Jan. 28, 1977

[30] Foreign Application Priority Data
Feb. 2, 1976 Germany .............................. 2603882

[51] Int. Cl.² ........................................... F16F 15/10
[52] U.S. Cl. ..................................... 74/574; 188/1 B; 308/10
[58] Field of Search .................. 74/574; 290/4 A; 188/1 B; 416/500; 308/10

[56] References Cited

U.S. PATENT DOCUMENTS

| 2,320,721 | 6/1943 | Erickson | 74/574 |
| 3,856,200 | 12/1974 | Lieb | 308/10 X |
| 3,909,082 | 9/1975 | Ishikawa et al. | 308/10 |

FOREIGN PATENT DOCUMENTS 2,253,036  5/1974  Germany.

Primary Examiner—Edgar W. Geoghegan
Attorney, Agent, or Firm—Haseltine, Lake & Waters

[57] ABSTRACT

A high-speed rotation system susceptible to vibration includes a relatively thin and flexible shaft which has first and second ends, a rotating member disposed on the first end of the shaft, and a planetary gear including a torque-transmitting sun gear which is connected to and restrains the second end of the shaft. A magnetic bearing surrounds at least part of the rotating member for damping the vibration of the rotation system.

11 Claims, 1 Drawing Figure

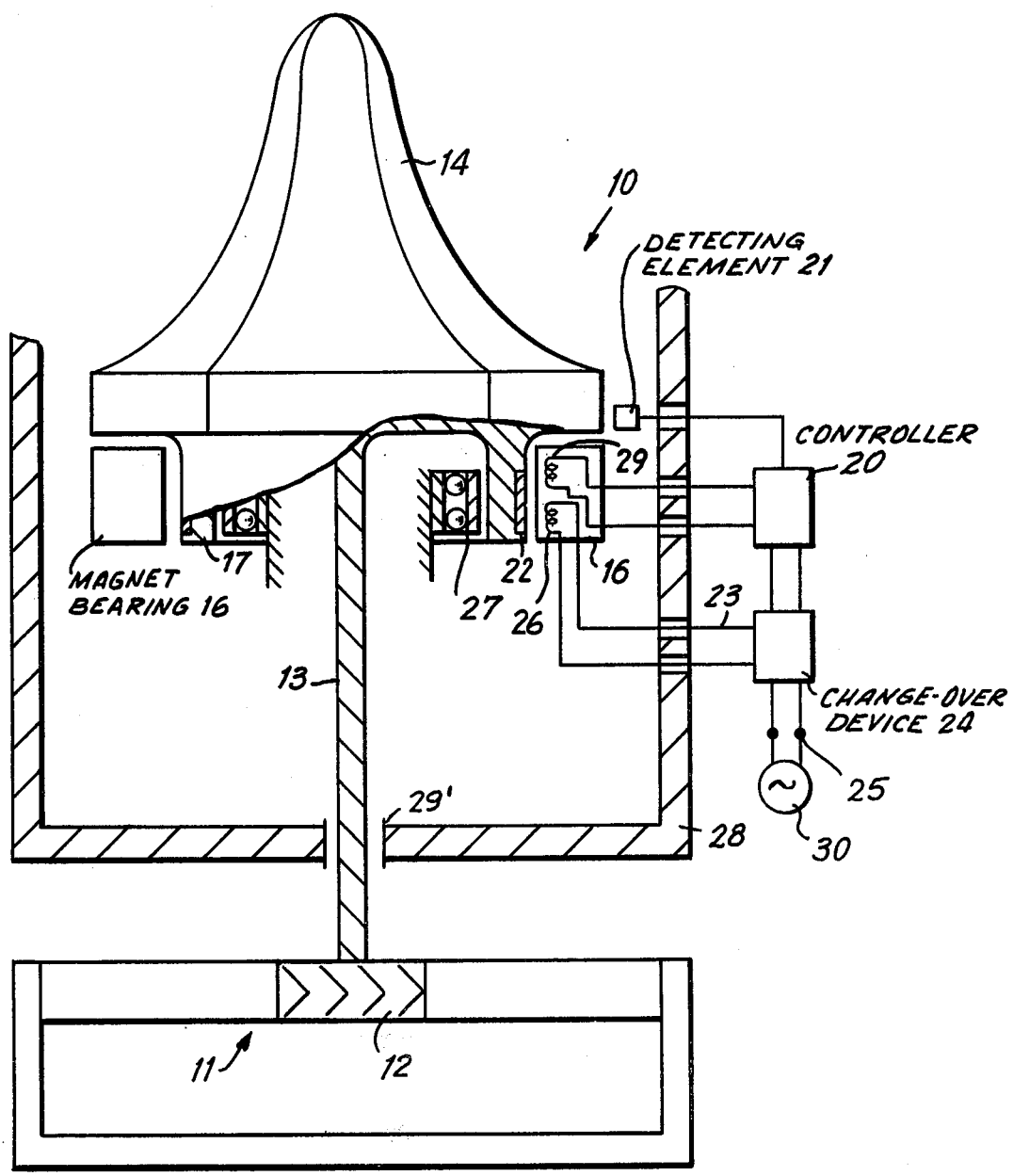

HIGH-SPEED ROTATION SYSTEM

FIELD OF THE INVENTION

This invention relates to a high-speed rotation system which comprises a shaft carrying a rotating member, and a planetary gearset cooperating with the shaft.

DESCRIPTION OF THE PRIOR ART

Rotation systems of this type are finding use in gas turbines, compressors and similar constructions. With previously disclosed systems the rotor, consisting of a rotating body and shaft, and the planetary gearset are supported separately and connected to one another by means of a claw coupling. This arrangement obviously necessitates very special bearing provisions to ensure stable operation of the rotation system at a minimum of vibration, where the revolving members, especially the rotating body, are allowed very little latitude in terms of imbalance.

It has also been found that the previously disclosed construction is less than ideally suited for use at certain conditions, such as in active or corrosive media and as might be encountered by compressors for active or corrosive fluids or by high-speed rotating bodies operating in vacuum. Sealing problems which are very difficult to solve are often encountered here, as are problems caused by the incompatibility of the bearing oil vapors with a vacuum condition or with the process medium.

SUMMARY OF THE INVENTION

In a broad aspect the present invention provides a rotation system of the aforesaid type which is easy to manufacture, operable reliably in a largely oscillation-type manner and is suitable for high-speed operation at a minimum of vibration and, if necessary, in active or corrosive media.

It is a particular object of the present invention to provide an arrangement where the rotating body is connected to a thin, flexible shaft, one end of which is connected to the torque-transmitting sun gear of the planetary gearset, the sun gear restraining the shaft, and where a magnetic bearing is provided for damping action.

The thin shaft enables a flexible and, thus, direct connection to be made between the rotating body and a planetary gearset without resorting to the coupling commonly associated with previously disclosed arrangements. Excursions of the rotating body from its spin axis are absorbed by the deflecting shaft to relieve the sun gear or planetary gearset of all appreciable load when the rotating body tends to vibrate as a result of, for example, imbalances.

Stabilization of the rotation system is achieved by the additional damping action of the magnetic bearing. This system practically eliminates all wear on the bearing and alleviates the wear on the gearset because of the low load transmitted through the flexible construction. The problems attending mechanical bearings as a result of imbalances in the rotating members are normally overcome by careful manufacture of optimally balanced rotating members and/or by damping devices carrying the bearings. These problems are largely eliminated in the arrangement of the present invention, however, because apart from the gearset it contains practically no rigid bearings and because the gearset is protected, by the flexible shaft, from stresses due to unbalanced loads.

The damping action of the arrangement is improved further if use is made, in accordance with this invention, of a magnetic bearing with actively restrains and/or dampens the system and which is fitted with at least one detecting element to sense deflections and irregularities in the form of signals which, processed for optimum restraint and damping, act on the restoring forces, which additionally provides a further advantage in the form of greater latitude in terms of manufacturing tolerances.

An electromagnetic bearing requires outside energy; thus the entire system is placed in jeopardy, or is prone to damage, should the supply of energy by interrupted. Protection of a system form such jeopardy is achieved if in accordance with the present invention the rotation system is assigned a generator arranged to be driven from the rotation system, the generator being provided to supply the magnetic bearing with normal or emergency current. The generator is preferably provided with a flexible shaft forming the rotor of the generator. The generator is preferably driven through a minor drive of the planetary gearset, and the drive shaft of the gear preferably carries the rotor of the generator. The magnetic bearing is preferably provided with an additional coil which cooperates with the rotor independently driven via the planetary gearset to form a generator. The current generated by the generator is directed to a source to feed the bearing coil and thus prevent failure of the bearing.

At low rotor speeds, when the generator is no longer effective, the present invention provides an emergency device, a plain or sleeve gearing.

In conjunction with the emergency device, the magnetic bearing can be operated in a self-supporting manner with the generator, where the emergency device supports the rotor during the run-up or coast-down process.

The present invention provides a further advantage in that the inventive device is fully suitable for use in corrosive or active media or in vacuum. The bearing provisions in no way present a handicap in this respect, because the magnetic bearing is readily accommodated without ill effect in the space accommodating the rotor. At worst, a protective coating would be needed. The sealing problems are also alleviated considerably, because apart from the gearset, there is no reason to exclude any part of the rotation system from this space, so that the casing can be ideally adapted and arranged to suit the intended application.

The space accommodating the rotating body in the area of the spin axis is preferably sealed at the end of the shaft near the gearset. Sealing thus gives little trouble, especially since the shaft is positionally stable at this end and as thermal loads and wear on the seal are no problem considering the moderate peripheral speed of the thin shaft. This makes itself felt most importantly in the case of high-speed rotors.

BRIEF DESCRIPTION OF THE DRAWING

The sole FIGURES. of the accompanying drawing illustrates a compressor as an embodiment of the present invention.

DESCRIPTION OF THE PREFERRED EMBODIMENTS

The compressor 10 is provided with a gearset 11 which is driven from a source not and which transmits torque to a rotating body 14, here a compressor rotor, via a sun gear 12 and a thin shaft 13. The rotating body 14 is supported in a frictionless manner by means of an active magnetic bearing 16 acting on a skirt 17. An adjusting field means 29 of the magnetic bearing is influenced by a controller 20 responding to signals from a detecting element 21, which senses the width of gap.

Rotor movements are compensated by the flexible shaft 13 so that the gearset remains largely unstressed. The energy of vibration is absorbed by the deflection of the shaft in cooperation with the active magnetic bearing 16. The inventive system is thus suitable for devices having high-speed rotors and is insensitive to imbalances in the rotor. Irregular movements of the rotor are sensed by the detecting element 21, and the resulting electric signals, suitably processed, vary the magnetic field of the bearing for optimum stabilization via a suitable control means.

To protect the rotor in the event of an interruption in the flow of power to the damping bearing, the magnetic bearing is provided with a second coil system 26 to form a generator. The generator rotor is formed, e.g., by the bearing area, fitted with pole shoes 22, or by the skirt 17 of the rotating body 14. When the power supply is interrupted, the rotor, driven from a separate source of energy and continuing in rotation, induces a current in the generator coil 26 of the generator, and that current is directed to the bearing coil 29 via a line 23 and a change-over means 24. The change-over means 24 is connected through connecting points 25 with a power supply 30 and automatically establishes connection to the generator, should the energy supply fail. The generator is optionally formed also by other rotating members of the rotation system, such as shaft 13 or a drive shaft of the planetary gear.

The generator can generally, however, also be provided for the supply of power to the magnetic bearing. In that case an emergency holding device 27 arranged as a starting bearing will support the rotating body 14 at low speeds during acceleration or deceleration of the rotor.

The rotor is surrounded by a casing 28, here shown only in part, which serves to guide the fluid under compression. The casing is shown without any further details or considerations of fluid dynamics. The casing is merely illustrated to show that apart from the dimensions the casing can be arranged without considering the rotor and its bearings. Sealing at the spin axis can generally be effected at any point along the shaft. In accordance with the present invention, sealing is effected at the shaft end near gearset 11. At this location the thin shaft, which revolves at an advantageously low peripheral speed, is sufficiently stabilized positionally and poses no problems to seal 29' in terms of radial deflections.

It will be understood that my invention is not limited to the above embodiments shown, and variations may be made which are within the scope of the appended claims.

What is claimed is:

1. A high-speed rotation system susceptible to vibration comprising:

a relatively thin and flexible shaft having first and second ends;

a rotating member disposed on the first end of said shaft;

a planetary gear including a torque-transmitting sun gear cooperating with said shaft, said sun gear being connected to and restraining the second end of said shaft, and magnetic bearing means surrounding at least part of said rotating member system, for damping the vibration of said rotation system.

2. A high-speed rotation system according to claim 1 wherein said magnetic bearing means comprises an active magnetic bearing means, having an adjusting field means, said magnetic bearing surrounding at least part of said rotating member, a gap being formed between said rotating member and said magnetic bearing means, and further comprising a signal-generating detecting element disposed in the vicinity of said rotor for sensing the width of said gap and control means connected to said detecting element for controlling the adjusting field means in dependence of the signals generated by said detecting element.

3. A high-speed rotation system according to claim 1 further comprising a generator connected to said magnetic bearing means for supplying the latter with current.

4. A high-speed rotation system according to claim 3, wherein said current is normally provided when said rotation system is operative.

5. A high-speed rotation system according to claim 1 wherein said magnetic bearing means is normally supplied with current from an external power system, and further comprising a generator connectible to said magnetic bearing means for supplying the latter with emergency current upon failure of the external power system.

6. A high-speed rotation system according to claim 3 wherein said generator has a rotor, and wherein said flexible shaft forms the rotor of said generator.

7. A high-speed rotation system according to claim 3 wherein said generator is driven through said torque-transmitting sun gear.

8. A high-speed rotation system according to claim 3 wherein said planetary gear has a drive shaft, and said generator has a rotor, said rotor being mounted on said drive shaft.

9. A high-speed rotation system according to claim 3 wherein said magnetic bearing means includes a current-generating coil, said coil cooperating with said rotating member, for generating a current supplyable to a bearing coil, said rotating member being independently drivable through said planetary gear to form a generator.

10. A high-speed rotation system according to claim 1 further comprising an emergency holding device for said rotating member, said holding device being a bearing adapted for holding said rotating body when revolving at a relatively low number of revolutions.

11. A high-speed rotation system according to claim 1 further comprising a chamber for receiving said rotating member, said chamber being formed with an opening for said shaft to project therethrough, said chamber being fillable with a fluid and operable under pressure, and a seal for closing said opening, said seal being disposed in the vicinity of said second end of said shaft.

* * * * *